United States Patent Office 3,110,634
Patented Nov. 12, 1963

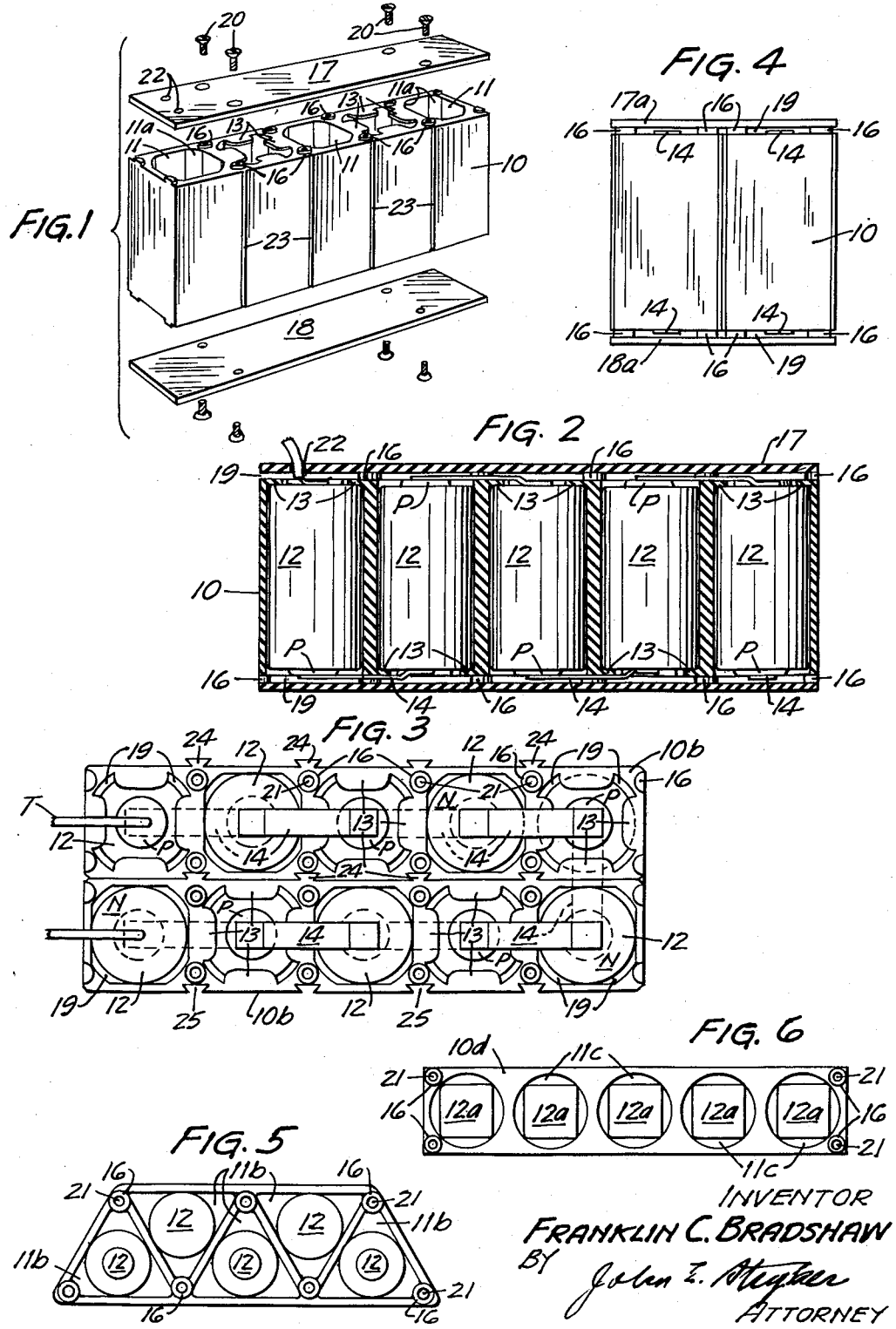

3,110,634
MULTIPLE CELL BATTERY CASE
Franklin C. Bradshaw, Minneapolis, Minn., assignor to Gould-National Batteries, Inc., St. Paul, Minn., a corporation of Delaware
Filed June 29, 1961, Ser. No. 120,588
5 Claims. (Cl. 136—173)

This invention relates to a battery case for use in fabricating batteries of different voltages and capacities through the combination of a number of batteries of standard size or predetermined size and shape. Although the invention has general applicability to batteries of many types, including both wet and dry cells, it is particularly useful, for reasons that will be stated hereafter, in connection with hermetically sealed, rechargeable batteries which are exothermic under some conditions of use.

Heretofore, a number of sealed, rechargeable nickel-cadmium cells, for example, have been assembled in compact groups. The means used in packaging such cells in an integral unit have proved unsatisfactory in several respects. For example, the commonly used procedure of combining cells by "potting" them in a body of plastic material has been found disadvantageous inasmuch as heat generated in sealed cells during their recharge is not readily dissipated through the plastic compound around the cells, and the cells so combined can thus be damaged by overheating. Another shortcoming of potted multi-cell batteries lies in the fact that the failure of a single cell in such units makes the entire battery useless, or, stated conversely, there is no way in which a defective cell in a potted multi-cell battery can be replaced with a fresh cell without completely rebuilding the battery. Cells of standard sizes have also been assembled in relatively large batteries by packaging them in sheet metal containers. Packaging in such containers has been relatively expensive and has required additional electrical insulation for each cell, thereby adding further to the cost of the packaging, both in labor and materials costs.

It is an object of my invention to provide a low cost battery case which can be used, either as a single case or in conjunction with identical units, to form batteries containing any number of standard battery cells in any desired electrical circuit grouping.

A further object is to provide a multi-cell battery case which will be durable in use and efficient in respect to insulating characteristics, yet light in weight and of minimal outside dimensions.

Another object is to provide a multi-cell battery case which will allow the unrestricted transfer of heat generated in cells contained therein to the surrounding atmosphere.

A further object is to provide a multi-cell battery case which will permit the convenient replacement of exhausted or defective cells in the case with fresh cells and which can therefore be re-used for a comparatively long time.

A still further object is to provide a battery case by means of which a manufacturer can conveniently and expeditiously fabricate large numbers of batteries of diversified sizes with a minimum of labor and automatic assembling equipment and jigs.

In accordance with the invention, the above enumerated objects are attained by providing a battery case which is integrally molded from a suitable dielectric material in the form of an elongated block defining a series of pockets of such cross-sectional configuration that small battery cells of a particular size and shape will fit therein with minimal contact between the surfaces of such cells and the battery case, thus providing convective ventilation passages at the sides of the individual battery cells. This and other advantageous features of my invention will be best understood by reference to the accompanying drawing in which:

FIGURE 1 is an exploded perspective view illustrating a multi-cell battery case unit embodying the present invention;

FIG. 2 is a longitudinal sectional view of the same battery case with preformed cylindrical cells in place in the pockets;

FIG. 3 is a plan view showing two interconnected multi-cell battery cases embodying a modification of the invention;

FIG. 4 is an end view of two interconnected units having common top and bottom cover plates connecting them;

FIG. 5 is a plan view showing another modification of the invention having pockets of triangular shape in cross section for battery cells of cylindrical shape, and FIG. 6 is a plan view showing a further modification wherein the pockets have substantially cylindrical walls to contain cells of rectangular or other non-circular shape in cross section.

Referring to FIGS. 1 and 2, the case comprises a body 10 molded from a suitable dielectric material, e.g., polyethylene or nylon plastic, defining a series of multilateral pockets 11, symmetrically disposed in a single row and having parallel open, normally upper and lower ends. As shown, each of the pockets 11 is substantially square in cross section and has reinforcing corners portions 11a. The distance between opposite walls of the pockets 11 is approximately equal to the diameter of the cylindrical battery cells, indicated at 12, to be contained in the pockets so that the walls of each pocket are disposed tangentially to and in contact with the battery cells contained therein. Short inwardly projecting flanges 13 are formed on the body 10 at the upper and lower ends of adjacent pockets 11. These flanges perform the important function of insulating the cylindrical wall of a battery cell from an intercell connector, such as a connector 14 (FIGS. 2 and 3), extending between the cells of adjacent pockets. The flanges 13 also serve as stops against which a cell may be positioned in each pocket.

A single cell 12 of ordinary flashlight or "D" type may be placed in each pocket 11 or, alternatively, a number of "button" type hermetically sealed cells may be stacked within each of the pockets 11 and suitably connected in series or parallel circuits with similarly stacked cells in the adjacent pockets.

In the modification shown in FIG. 5, the pockets 11b are of substantially triangular shape in cross section and are adapted to contain battery cells 12 of cylindrical shape. In another modification of the invention shown in FIG. 6, the pockets 11c may be of cylindrical shape to receive cells 12a of rectangular or other non-circular cross sectional shape.

It is thus an essential of my invention that the cross sectional shape of the pockets be so correlated to the cross sectional shape of the cells to be contained therein as to provide vent passages extending along the exterior surfaces of the cells in the pockets between parallel lines of contact with the pocket walls.

The need for the insulating flanges 13 arises from the fact that the cylindrical shell of most sealed battery cells is of one polarity, usually the negative terminal, and the positive terminal is either the cover of the cell or a small protrusion integral with the cover. The cover of such cells is hermetically sealed by crimping the open end rim of the shell over the cover and the cover is separated by insulating material from the shell. A flat intercell connector such as that indicated at 14, when spot welded at one end to the cover of a cell and at the other end to the shell of the adjacent cell, must be insulated from the crimped edge to prevent shorting. It will be evident that the intercell connectors 14 for series circuit connections are prevented from causing short circuits by the flanges 13 which bridge the cylindrical or other shell wall at an end of each pocket 11.

The assembly of a multiplicity of cells in a series circuit is facilitated by placing the positive covers of cells alternately at the upper and lower ends of the pockets 11. For such series connections, the flanges 13 are also alternately located at the upper and lower ends of the adjacent pockets. If cells are to be connected in parallel, the flanges 13 may be located at the same end, either top or bottom, of the several pockets 11.

Spacing members 16 project from the normally upper and lower surfaces of the body 10 to separate a cover plate 17 and a base plate 18 from the open ends of the pockets 11, as indicated at 19 in FIG. 4, thus venting the pockets to atmosphere when the plates 17 and 18, or 17a and 18a, are in place. These plates are made of a suitable dielectric material, e.g., polyethylene, and may be attached to the body 10 by screws 20 of a size suitable for self-tapping engagement with holes 21 formed coaxially in the spacing members 16. A plurality of multi-cell battery cases may be joined together, as shown in FIG. 4, by a unitary cover plate 17a and a similar base plate 18a fastened to the spacing members 16. For some installations, a cover and base plate may not be used, but the spacing members 16 will be effective to allow air flow to and from the vent passages along the exterior surfaces of the cells contained in the case. Holes 22 (FIG. 1) may be provided in the cover plate 17 to receive terminal leads (not shown) for the cells contained in the case.

As shown in FIG. 1, the parallel side walls of the body 10 may be formed with a series of parallel grooves 23 severally coinciding with planes at the junction of the pockets 11. These grooves indicate the location of the walls between pockets and may be used to facilitate subdividing the case into any selected number of pockets by sawing or otherwise cutting through the body 10 in a selected plane defined by grooves 23 in the opposite side of the body 10.

Any number of the bodies 10 having substantially plane side walls may be secured together in a group by adhesive or any other suitable means. For example, FIG. 3 shows two similar casing bodies 10b connected together by interlocking tongue and grooves formed on the otherwise plane side walls of the bodies. As shown, a plurality of parallel tongues 24 of dovetail shape in cross section may be formed on one side of each of the bodies 10b to fit in similarly shaped groove formations 25 formed in the wall of the adjacent body. FIG. 3 further illustrates a typical series arrangement of intercell connectors 14, each connected at one end to a positive terminal P of a cell and at the other end to a negative terminal N of the adjacent cell. Terminal leads T and T1 extend to the positive and negative terminals respectively of the battery. It will be evident that the insulating flanges 13 separate the several intercell connectors and terminal leads from the polar negative rims adjacent to the positive cell terminals.

No jigs or other special equipment is needed for the rapid assembly of the battery cells in the several pockets of the case or container. The cells without insulating covering or jacketing on their outer surfaces are merely inserted in the case pockets with the positive terminal end of the cell in contact with the insulating flanges 13 for series circuit connections. The intercell connectors 14 and terminal leads T and T1 are then welded or soldered in place to complete a multiple cell battery of the size required. Either before or after the insertion of the cells in the several rows of pockets any number of the case bodies 10 or 10b may be connected together by simple means as described.

My objects of providing ventilation, insulation and good cell support at low costs for assembly and material in a multi-cell battery case are thereby attained. Since the cell terminals are readily accessible, tests for defective cells and replacement of individual cells when necessary are greatly facilitated.

I claim:

1. A multi-cell battery case for preformed exothermic battery cells of a particular shape comprising, a body of dielectric material defining a multiplicity of pockets, each adapted to receive one or more of said cells and having walls formed to contact said cells along spaced parallel lines, said pockets having open ends disposed in parallel planes spaced to coincide approximately with the end surfaces of the several cells to be contained in said pockets and affording open-ended vent passages between said lines of contact and the outer surfaces of the several cells contained therein, and a plurality of spacing members projecting in spaced relation one to another from the ends of said pockets to afford vent passages at the ends of the pockets communicating with said open ended vent passages when an end of the pockets is covered.

2. A multi-cell battery case in accordance with claim 1 including stop flanges projecting inwardly from walls of each of said pockets at one end thereof for engagement with an end surface of a cell in the pocket.

3. A battery cell case in accordance with claim 1 including a removable closure plate for an end of the several pockets, and means for securing said closure plate in spaced relation to said open end of the pockets.

4. A battery case in accordance with claim 1 in which said body is formed with grooves in the opposite sides thereof extending along the junctions between the several cells to facilitate the subdividing of said body into units having a selected number of pockets.

5. A battery case in accordance with claim 1 in which the pockets in said body are disposed in a single row and the longitudinal sides of said body have substantially plane parallel surface areas adapted to fit in contact with similar surface areas of additional and similar battery cell case units and a similar multicell battery case unit fitting in contact with such surface areas of said first units and means for joining said units together comprising at least one cover plate overlying said spacing members of the respective units and secured thereto by removable fasteners.

References Cited in the file of this patent

UNITED STATES PATENTS 772,415     Jackson _____ Oct. 18, 1904

FOREIGN PATENTS 743,215     Great Britain _____ Jan. 11, 1956